SAWTOOTH SIGNAL GENERATOR

Filed Oct. 9, 1964

INVENTOR.
NORMAN P. HUFFNAGLE
BY
[signature]
Don D. Doty
ATTORNEYS

United States Patent Office 3,383,549
Patented May 14, 1968

3,383,549
SAWTOOTH SIGNAL GENERATOR
Norman P. Huffnagle, 607 W. 11th St., Panama City, Fla. 32401
Filed Oct. 9, 1964, Ser. No. 402,977
9 Claims. (Cl. 315—25)

ABSTRACT OF THE DISCLOSURE

A transistorized linear sawtooth generator having a synchonization amplifier, a unijunction relaxation oscillator with unique course and vernier frequency adjustments, and an emitter-follower output having a properly phase-related positive feedback path to said relaxation oscillator for frequency stabilization and linearity improvement purposes.

The invention described herein may be manufactured and used by or for the Government of the United States of America for governmental purposes without the payment of any royalties thereon or therefor.

The present invention relates generally to signal generators and in particular is a sawtooth generator circuit that may be advantageously used in the horizontal sweep circuit of an oscilloscope.

In the past, sawtooth generators have incorporated such control elements as gas thyratrons, tube-type relaxation oscillators, and silicon controlled rectifiers. Although eminently satisfactory for short periods of time or in certain operational configurations, the circuits containing these elements have numerous disadvantages. For example, the gas thyratron tubes usually become unstable with age, tube-type relaxation oscillators ordinarily become erratic after many cycles of operation, and silicon controlled rectifiers require complex circuitry to make them operate efficiently. Moreover, said elements are usually susceptible to excessive shock and breakage and, in addition, all require high voltage power supplies in order to function in a satisfactory manner. As a general rule, the respective circuits which incorporate one or more of said elements are complex, excessively space-consuming, and burdensome, as well; and, consequently, do not readily lend themselves to being miniaturized to any practical degree.

The subject invention overcomes most of the disadvantages of the prior art in that it is electrically stable, the circuitry is simple and relatively impervious to shock, no high voltage power supplies are needed, reliability is improved, and it readily lends itself to being miniaturized to a size approaching optimum for most operations. Of course, simplicity and miniaturization usually effect considerable savings in materials, space, and cost of manufacture. Last, but by no means least, a clean linear sawtooth signal is generated by this invention which is considered to be an improvement over that produced by prior art of comparable construction cost.

It is, therefore, an object of this invention to provide an improved sawtooth signal generator.

Another object of this invention is to provide a sawtooth signal generator that may be readily synchronized with a given input signal as a result of improved sensitivity to both the amplitude and frequency thereof.

Another object of this invention is to provide a relatively stable sawtooth signal generator circuit that is more reliable than comparable prior art generators.

Still another object of this invention is to provide a sawtooth signal generator circuit that is relatively impervious to shock.

Still another object of this invention is to provide a sawtooth signal generator that operates on relatively low voltage and, thus, requires no high voltage power supply.

A further object of this invention is to provide a sawtooth signal generator circuit that is readily adapted for miniaturization, and thereby requires less space and materials and is less burdensome.

Another object of this invention is to provide an improved synchronized sawtooth generator that is easily and economically manufactured, maintained, and operated.

Another object is to provide an improved horizontal sweep circuit for an oscilloscope.

Another object of this invention is to provide an improved synchronizing amplifier-sawtooth signal generator combination.

Another object of this invention is to provide a relaxation oscillator having improved frequency sensitivity and controllability.

Another object of this invention is to provide a sawtooth signal generator having improved linearity and rapid discharge characteristics.

Still another object of this invention is to provide a sawtooth signal generator having precision synchronization capabilities.

A further object of this invention is to provide a sawtooth signal generator that produces a linear sawtooth signal at a number of predetermined frequencies, rather than at just one frequency.

A further object of this invention is to provide a sawtooth signal generator that is less susceptible to drift than comparable prior art devices.

Other objects and many of the attendant advantages will be readily appreciated as the subject invention becomes better understood by reference to the following detailed description when considered in conjunction with the accompanying drawing wherein.

Figure 1:
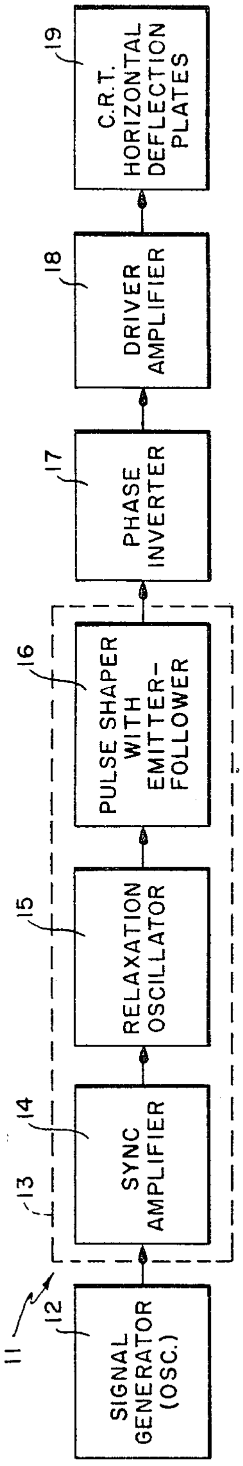
FIG. 1 is a block diagram of the horizontal sweep circuit of an oscilloscope that may incorporate the subject sawtooth signal generator to an advantage.

Referring now to FIG. 1, there is shown an oscilloscope horizontal sweep circuit 11 as having an approprite signal generator 12, such as an oscillator or the like, with the output thereof coupled to the input of a sawtooth signal generator 13. The output of signal generator 12 is, of course, actually applied to a synchronization amplifier 14, with the output thereof coupled to the input of a relaxation oscillator 15. A pulse shaper with emitter-follower circuit 16 is coupled to the output of relaxa'ion oscillator 15. The combined sync amplifier 14, relaxation oscillator 15, and pulse shaper with emitter-follower 16, of course, constitute the aforementioned sawtooth signal generator 13, with the output of the latter being taken from the output of the emitter-follower, as will be discussed in more detail in conjunction with FIG. 2.

A phase inverter 17 is connected to the output of pulse shaper with emitter-follower 16, and the output thereof is coupled through a driver amplifier 18 to the horizontal deflection plates of a cathode ray tube (CRT) 19 in the conventional manner.

With exception of the unique and uniquely combined components of sawtooth signal generator 13, all of the other elements represented in block diagram form in FIG. 1 are well known and conventional per se. Accordingly, it is the arrangement, interconnection, and interaction of said conventional elements with the aforesaid unique elements that results in a new combination which incorporates the subject invention. The unique elements previously referred to are, of course, illustrated in detail in FIG. 2.

Figure 2:
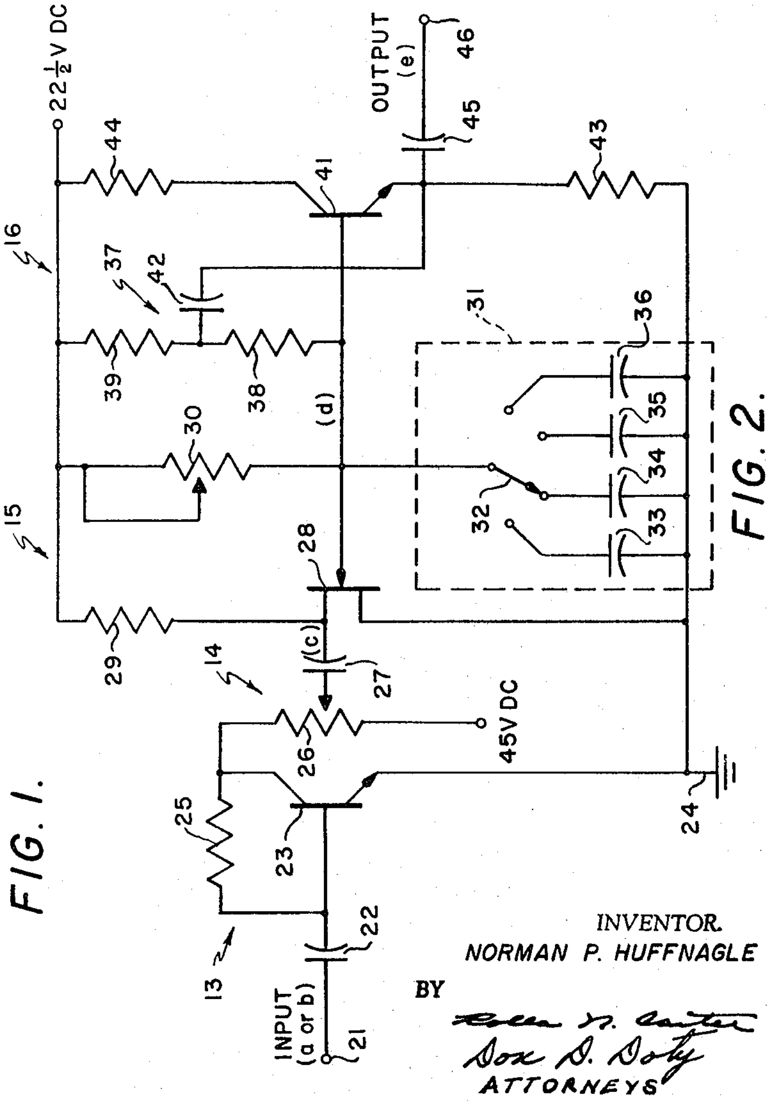
FIG. 2 is a detailed schematic diagram of the sawtooth signal generator circuit of FIG. 1.

Referring now to FIG. 2, there is shown an input terminal 21 to which is supplied any appropriate input signal, such as that provided by signal generator 12. A .047 mfd. coupling capacitor 22 is connected between said input terminal 21 and the base of a 2N343 transistor 23. The emitter of transistor 23 is connected to ground 24, and the collector thereof is connected through an 82,000 ohm resistor 25 to the base thereof and through a 10,000 ohm resistance portion of a potentiometer 26 to a 45 volt direct current voltage.

The slider of potentiometer 26 is connected through a .047 mfd. coupling capacitor 27 to the input of relaxation oscillator 15 which, in this particular case, is for all practical purposes the second base of a 2N1671A unijunction transistor 28. The first base of unijunction 28 is connected to ground, and the aforesaid second base thereof is also coupled through a 330 ohm resistor 29 to a 22.5 volt direct current B+ voltage supply. The emitter of transistor 28 is coupled through a one megohm vernier sync lock variable resistor 30 to said 22.5 v. DC and through a coarse frequency selector 31, composed of a manual selector switch 32 and a predetermined plurality of capacitors, to ground. Said plurality of capacitors may, for instance, include a 1.0 mfd. capacitor 33, a 0.1 mfd. capacitor 34, a .047 mfd. capacitor 35, and a 0.1 mfd. capacitor 36, and/or such other capacitors as necessary or desirable for any given operational circumstances.

The output of relaxation oscillator 15 is taken from the emitter of unijunction transistor 28 and is also coupled through a voltage divider network 37, composed of series connected resistors 38 and 39, to said 22.5 v. DC. In addition, said unijunction transistor emitter is connected to the base of a 2N343 emitter-follower transistor 41. A 1.0 mfd. capacitor 42 interconnects the common junction of the aforesaid series connected resistors 38 and 39 and the emitter of transistor 41. Said emitter is also coupled through a 2200 ohm resistor 43 to ground, and the collector thereof is coupled through a 1000 ohm resistor 44 to said 22.5 v. DC. The output of emitter-follower transistor 41 is taken from the emitter thereof and is coupled through a .047 mfd. coupling capacitor 45 to an output terminal 46.

Figure 3:
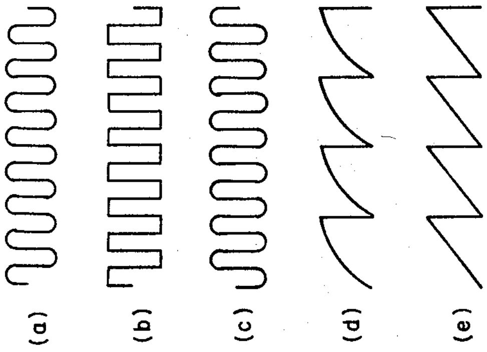
FIG. 3 is a graphical representation of various and sundry idealized waveforms that may occur in the subject invention.

The operation of the subject invention will now be discussed in connection with FIGS. 1, 2, and 3.

Signal generator 12 may be an oscillator which produces an output signal having a waveform similar to that shown in FIG. 3*a*. Or, in the alternative, it may be a device which produces a waveform such as is shown in FIG. 3*b*. These two waveforms are, of course, presented merely by way of illustration of the variety of typical waveforms that may be used as an input to sync amplifier 14. If then, the signal having, say, the waveform of FIG. 3*a* is supplied to input terminal 21, synchronizing amplifier 14 takes that portion of it to be synched to, amplifies it to a more useful range of levels, the most useful signal level of which is manually selected by appropriate adjustment of the slider of potentiometer 26, and applies this most useful signal level to the second base of unijunction 28 of the relaxation oscillator. A representation of a typical signal constituting said most useful signal level is depicted by the waveform of FIG. 3*c*.

The operational frequency of relaxation oscillator 14 is contingent on the capacitance of the manually selected one of the capacitors of coarse frequency selector 31 and the resistance selected as the result of manually adjusting variable resistor 30 in the emitter and second base circuits of unijunction transistor 28, respectively.

During operation, the sync signal tends to overdrive oscillator 15 and, thus, force it to oscillate at the frequency of the sync amplifier. Vernier resistor 30 acts to align the input frequency with that of the natural frequency of the oscillator which, in turn, improves the frequency sensitivity thereof and causes precision synchronization to be effected with any of several whole number of cycles of the input signal supplied to terminal 21.

Hence, as a result of the time constant resulting from the manual selection of any one of capacitors 33 through 36 and the manual setting of variable resistor 30, an imperfect sawtooth signal having a waveform similar to that depicted in FIG. 3*d* is obtained at the emitter output of unijunction transistor 28. This waveform is then further refined and shaped in the pulse shaper portion of the circuit, including voltage divider network 37 and feedback capacitor 42 which acts as a properly phase-related positive feedback path to the oscillator portion of the invention and this, too, tends to stabilize the oscillator at the selected frequency. Such stabilization, in turn, tends to further refine the waveform of FIG. 3*d* and produce a clean, linear sawtooth signal having a waveform comparable to that shown in FIG. 3*e*.

Emitter-follower 41 is, of course, connected to the relaxation oscillator in order to act as a buffer stage and thereby isolate the load connected to the output therefrom. This, too, assists in the refinement of the sawtooth signal being generated because it prevents the load (such as phase inverter 17) from adversely varying internal impedances which may cause some signal distortion. Of course, the circuit isolation provided by cathode follower 41 also facilitates impedance matching between the subject sawtooth signal generator and its associated load. In this particular embodiment, such load would effectively be phase inverter 17, driver amplifier 18, and the horizontal deflection plates of cathode ray tube 19.

Although the sawtooth signal generator of this invention is primarily intended to be incorporated in an oscilloscope sweep system such as is diagrammatically depicted in FIG. 1, it should be understood that it may be used in any system where a stable, linear, clean-cut precision synchronized sawtooth type signal is required or may be used to an advantage.

Obviously, other modifications and embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A sawtooth signal generator comprising in combination, amplifier means, a B+ voltage source, a ground, a unijunction transistor having a pair of bases and an emitter with one of the bases thereof connected to said ground and the other base thereof effectively connected to the output of said amplifier means and to said B+ voltage source, a coarse frequency selector connected between the emitter of said unijunction transistor and said ground, a vernier frequency selector connected between the emitter of said unijunction transistor and said B+ voltage source, a pair of series connected resistors connected in parallel with said vernier frequency selector, a transistor having a base, an emitter, and a collector with the base thereof coupled to the emitter of said unijunction transistor and the collector thereof effectively coupled to said B+ voltage source, a resistor interconnecting the emitter of said transistor and said ground, and a capacitor connected between the common junction of said pair of series connected resistors and the emitter of the aforesaid transistor.

2. A sawtooth signal generator comprising in combination, a ground, a first transistor having a base, an emitter, and a collector with the emitter thereof connected to said ground, a first resistor connected between the base and collector of said first transistor, a first positive direct current voltage source, a potentiometer having a resistance portion and a slider arm adapted for contact with said resistance portion with the resistance portion thereof connected between the collector of said first transistor and said first positive direct current voltage source, a unijunction transistor having a first base, a second base, and an emitter with the first base thereof coupled to said ground, a coupling capacitor connected between the slider arm of said potentiometer and the second base of said unijunction transistor, a second positive direct current voltage source, a second resistor connected between the second base of said unijunction transistor and said second positive direct current voltage source, a coarse frequency selector means connected between the emitter of said unijunction transistor and said ground, a vernier frequency selector means connected between the emitter of said unijunction transistor and said second positive direct current voltage source, a pair of series connected resistors connected between the emitter of said unijunction transistor and said second positive direct current voltage source, a second transistor having a base, an emitter, and a collector with the base thereof connected to the emitter of the aforesaid unijunction transistor, a third resistor coupled between the emitter of said second transistor and said ground, a fourth resistor coupled between the collector of said second transistor and said second positive direct current voltage source, and means connected between the emitter of said second transistor and the common junction of the aforesaid pair of series connected resistors for supplying a predetermined feedback signal thereto.

3. The device of claim 2 wherein said coarse frequency selector means connected between the emitter of said unijunction transistor and said ground comprises, a plurality of capacitors each of which has a capacitance that is different from the others and each of which is connected to said ground, and a selector switch connected between said plurality of capacitors and the emitter of said unijunction transistor.

4. The device of claim 2 wherein said coarse frequency selector means connected between the emitter of said unijunction transistor and said ground is a variable capacitance means.

5. The device of claim 2 wherein said vernier selector means connected between the emitter of said unijunction transistor and said second positive direct current voltage source comprises a variable resistor.

6. The device of claim 2 wherein said means connected between the emitter of said second transistor and the common junction of the aforesaid pair of series connected resistors for supplying a predetermined feedback signal thereto is a reactance means.

7. The device of claim 2 wherein said means connected between the emitter of said second transistor and the common junction of the aforesaid pair of series connected resistors for supplying a predetermined feedback signal thereto is a capacitor.

8. The device of claim 2 further characterized by, an input terminal, another coupling capacitor connected between said input terminal and the base of said first transistor, an output terminal, and still another coupling capacitor connected between said output terminal and the emitter of said second transistor.

9. A horizontal sweep circuit for an oscilloscope comprising in combination, a signal generator for producing a predetermined oscillatory signal of predetermined frequency, a synchronization amplifier coupled to the output of said signal generator, a relaxation oscillator connected to the output of said synchronization amplifier, a pulse shaper coupled to the output of said relaxation oscillator, an emitter-follower coupled to the output of said pulse shaper, a phase inverter connected to the output of said emitter-follower, a driver amplifier connected to the output of said phase inverter, and cathode ray tube horizontal deflection plates coupled to the output of the aforesaid driver amplifier.

References Cited

UNITED STATES PATENTS

| | | | |
|---|---|---|---|
| 3,041,470 | 6/1962 | Woodworth | 307—88.5 |
| 3,142,024 | 7/1964 | Mordwinkin | 331—60 |
| 3,048,788 | 8/1962 | Cochrane | 328—180 |

OTHER REFERENCES

General Electric Transistor Manual Sixth Edition p. 196, Copyright 1962.

General Electric Transistor Manual Seventh Edition pp. 312–320, Published Aug. 25, 1964.

RODNEY D. BENNETT, *Primary Examiner.*

JOHN W. CALDWELL, *Examiner.*

R. BLUM, T. H. TUBBESING, *Assistant Examiners.*